United States Patent

Hoge et al.

[11] Patent Number: 5,921,882
[45] Date of Patent: Jul. 13, 1999

[54] DUAL CAVITY TORODIAL TRACTION DRIVE TRANSMISSION HAVING MULTIPLE SPEED INPUTS TO A PLANETARY GEAR UNIT

[75] Inventors: Forrest William Hoge, Whitmore Lake; Daniel Warren McCarrick, Canton; Rudolf Beim, Bloomfield Hills, all of Mich.

[73] Assignee: Ford Global Technologies, Inc., Dearborn, Mich.

[21] Appl. No.: 09/055,369

[22] Filed: Apr. 6, 1998

[51] Int. Cl.$^6$ .............................. F16H 15/38; F16H 37/02
[52] U.S. Cl. ............................................. 475/215; 475/216
[58] Field of Search .................................... 475/215, 216, 475/217

[56] References Cited

U.S. PATENT DOCUMENTS

| | | | |
|---|---|---|---|
| 3,406,597 | 10/1968 | de Brie Perry, et al. ........... | 475/216 X |
| 3,820,416 | 6/1974 | Kraus ...................................... | 475/215 |
| 4,297,918 | 11/1981 | Perry . | |
| 4,464,952 | 8/1984 | Stubbs ..................................... | 475/216 |
| 4,628,766 | 12/1986 | de Brie Perry ......................... | 475/216 |
| 4,756,211 | 7/1988 | Fellows . | |
| 4,768,398 | 9/1988 | Greenwood . | |
| 4,922,788 | 5/1990 | Greenwood . | |
| 5,090,951 | 2/1992 | Greenwood ............................. | 475/216 |
| 5,401,221 | 3/1995 | Fellows et al. ......................... | 475/214 |

FOREIGN PATENT DOCUMENTS

| | | | |
|---|---|---|---|
| 0-084-724-A1 | 8/1983 | European Pat. Off. . | |
| 0-149-892-A2 | 7/1985 | European Pat. Off. . | |
| 0-177-240-A2 | 4/1986 | European Pat. Off. ............... | 475/216 |
| 1-228-749 | 7/1971 | United Kingdom . | |
| 2-100-372 | 12/1982 | United Kingdom ................... | 475/216 |
| 2-136-893 | 9/1984 | United Kingdom ................... | 475/216 |

*Primary Examiner*—Charles A Marmor
*Assistant Examiner*—Sherry Lynn Estremsky
*Attorney, Agent, or Firm*—Frank G. McKenzie

[57] ABSTRACT

An automatic transmission for an automotive vehicle includes two variator of the traction drive type, each variator including an input disc, an output disc, and rollers driveably engaged with the discs and adapted to vary continuously the ratio of the speeds of the output disc and input disc, the output disc of the first variator producing a predetermined speed in relation to the speed of an input shaft and driveably connected to a disc of the second variator. A planetary gear unit includes a carrier, a sun gear connected to mutually connected discs, a ring gear connected to the output disc of the second variator, and a set of planet pinions meshing with the respective sun gear and ring gear. Angular variation of the rollers causes the second variator to drive the ring gear at a variable speed relative to input shaft speed and the carrier to rotate in accordance with the speeds of the sun gear and ring gear.

7 Claims, 1 Drawing Sheet

DUAL CAVITY TORODIAL TRACTION DRIVE TRANSMISSION HAVING MULTIPLE SPEED INPUTS TO A PLANETARY GEAR UNIT

BACKGROUND OF THE INVENTION

1. Field Of The Invention

The present invention relates to automatic transmissions for automotive vehicles; more particularly, it pertains to a continuously variable transmission (CVT) of the toroidal traction variator type.

2. Description Of The Prior Art

Continuously variable transmissions of the toroidal race-rolling traction variator type are well known. CVTs of this type provide a continuously variable range of transmission ratios through the arrangement of possibly more than one epicyclic gear train. The engine drive variator has an output disc that delivers power to an epicyclic gear train that is also driven by an output shaft. More specifically, a variator output disc directly drives a sun gear of a planetary gearset.

CVT units of the toroidal race-rolling traction type wherein the output disc directly drives a sun gear of a planetary gearset are described in U.S. Pat. No. 4,756,211, EP Document 84,724, U.K. Patent 1,228,749, and U.K. Patent 2,136,893.

Multiple planetary gearsets incorporating a CVT transmission of the toroidal traction type is described in U.S. Pat. No. 4,768,398. The drive system described there includes two epicyclic gearsets. A first gearset provides a compound planet system by way of a second set of gears in the system. The annulus of the first epicyclic gearing provides drive to a final drive shaft and provides reverse drive by way of a second set of gears. Depending on the variator ratio, the first epicyclic gearing provides a forward speed, neutral or a reverse speed in low regime. The annulus of the second epicyclic gearing provides drive to the final drive shaft in high regime. This method, as well as those of the other mentioned patents, requires complex gearset arrangements.

It is therefore desirable to create a simpler but just as effective drive method.

SUMMARY OF THE INVENTION

It is an object of this invention to provide an automatic transmission with a continuously variable ratio range utilizing a toroidal-race rolling traction drive. An object of the invention is to improve fuel economy and reduce the cost of all-wheel drive and four-wheel drive powertrains.

It is another object of this invention to provide a variator traction drive adapted to drive the ring gear and sun gear of a planetary gearset at speeds that are varied by changing the speed ratio of the traction drive unit, thereby producing negative, zero and positive speed ratios.

According to the embodiment of the invention, there is provided a continuously variable transmission for an automatic transmission of an automotive vehicle comprising an input shaft; an output shaft; a first traction drive variator including a first disc driveably connected to the input shaft, a second disc, and a first roller driveably engaging the first and second discs at variable radial positions, for driving the second disc at a slower speed and opposite direction than the speed and direction of the input shaft; a second traction drive variator including a third disc driveably connected to the second disc, a fourth disc, and a second roller driveably engaging the third and fourth discs at variable radial positions, for steplessly changing the speed of the fourth disc with respect to the speed of the third disc; a clutch for alternately driveably connecting and releasing the input shaft and power source; and a second gear unit having a first component driveably connected to the input disc, a second component driveably connected to the output disc, and an output driveably connected to the output shaft, for driving the output at a speed determined by the speeds of the input disc and output disc.

The gear unit may be a planetary gearset including a sun gear driveably connected to at least one of the second disc and third disc, a ring gear driveably connected to the fourth disc, a carrier driveably connected to the output shaft, and a set of planet pinions rotatably supporting on the carrier and driveably engaged with the sun gear and ring gear.

DESCRIPTION OF A PREFERRED EMBODIMENT

Figure 1:
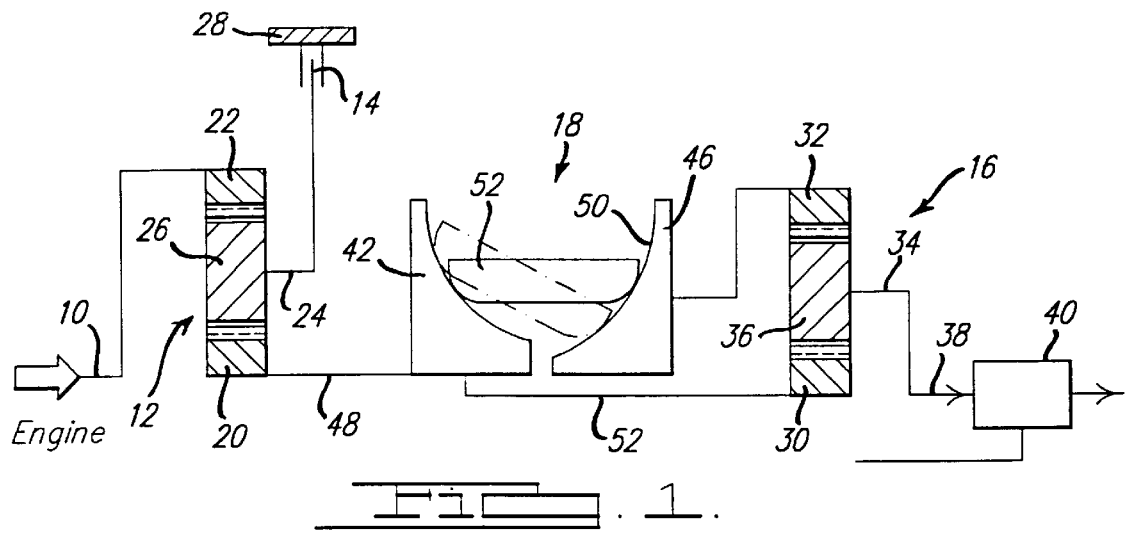
FIG. 1 is a schematic diagram of a continuously variable traction drive transmission.

Referring first to FIG. 1, a continuously variable transmission according to this invention includes an input shaft 10 driven by an internal combustion engine, electric motor or other power source. Shaft 10 is driveably connected to a first planetary gearset 12, start up brake 14, output planetary gearset 16, variator 18 of the toroidal traction drive type, and various elements driveably connecting components of the variator and the gearsets.

Planetary gearset 12 includes a sun gear 20; ring gear 22 surrounding the sun gear planet carrier 24, driveably held against rotation on the transmission case 28 and released therefrom through operation of brake 14; and a set of planet pinions 26 supported rotatably on carrier 24 in continuous meshing engagement with ring gear 22 and sun gear 20.

Planetary gearset 16 includes a sun gear 30; ring gear 32 surrounding the sun gear, driveably connected to disc 46; planet carrier 34, driveably connected to output shaft 38; and a set of planet pinions 36 supported rotatably on carrier 34 and in continuous meshing engagement with ring gear 32 and sun gear 30. Output shaft 38 is driveably connected to the input of a transfer case 40, adapted to transmit power alternately or concurrently to front and rear driveshafts extending from the transfer case to front and rear axle shafts. An example of a transfer case for this purpose is described in U.S. Pat. 4,648,492.

Toroidal variator 18 includes input disc 42, output disc 46, a toroidal cavity 50 defined by the interior surfaces of discs 42, 46, and a set of spaced, rotating, angularly displaceable rollers 52, each roller driveably engaged with the input disc and output disc. The rollers transmit torque between disc 42 and disc 46. A ratio control mechanism tilts or rotates the axis of the rollers, thereby changing the radial location of contact of the rollers on the discs and, in that way, the ratio of the speed of the output disc and speed of the input disc. Input disc 42 is driveably connected through shaft 48 to the engine shaft. Output disc 46 is driveably connected by member 50 to ring gear 32; input disc 42 is driveably connected by shaft 52 to sun gear 30.

The angular position of the set of rollers 52 located in the toroidal cavity 50 is tilted on trunnions about an axis directed substantially normal to the axis of input shaft 10. In this way the disc 46 is driven faster than the speed of disc 42 when rollers 52 are tilted so they contact disc 46 at a radially inner position and disc 42 at a radially outer position. When rollers 52 are tilted in the opposite angular direction, disc 42 drives disc 46 slower than the speed of disc 42.

The speed at which carrier 34 revolves can be changed to produce low, overdrive, and reverse drive in relation to the speed of the engine, and a geared neutral condition, in which carrier 34 does not revolve.

In one application of this invention, preferably sun gears 20,30 each has 40 teeth, ring gear 22 has 80 teeth, pinions 26 each has 20 teeth, pinions 36 have 16 teeth, and ring gear 32 has 72 teeth.

A forward low range having a speed 0.250 times that of the engine is produced by engaging brake 14 and setting the angular position of the rollers 52 so that output disc 46 and ring gear 32 rotate at 1.50 times the speed of the engine, input shaft 10, and ring gear 22 when the speed of sun gear 20, disc 42 and sun gear 30 is −2.00 times engine speed. With the sun gear 30 and ring gear 32 driven in this way, the speed of carrier 34 and output shaft 38 is 0.250 times that of the engine.

A forward overdrive range having an overall speed ratio of 2.00 is produced by engaging brake 14 and setting the angular position of rollers 52 so that the output disc 46 and ring gear 32 rotate at 4.222 times engine speed, while the speed of sun gear 20, disc 42 and sun gear 30 is −2.00 times engine speed. The resulting speed of carrier 34 and output shaft 38 is 2.00 times that of the engine.

Engaging brake 14 causes sun gears 20,30 and disc 42 to rotate at twice engine speed. By also adjusting the angular position of the rollers so that the output disc 46 and ring gear 32 rotate at −0.800 times engine speed, reverse drive having a gear ratio of −0.200 results.

The speed of carrier 34 depends on the speeds of ring gear 32 and sun gear 30, which can be changed independently by changing the gear ratio of the traction drive variator. With brake 14 engaged, zero gear ratio operation results when sun gears 20, 30 are driven at −2.00 times engine speed and ring gear 32 rotates at 1.11 times engine speed. These actions cause pinions to rotate at 5.00 times engine speed on carrier 34, but the carrier does not revolve and output shaft 38 does not rotate.

Figure 2:
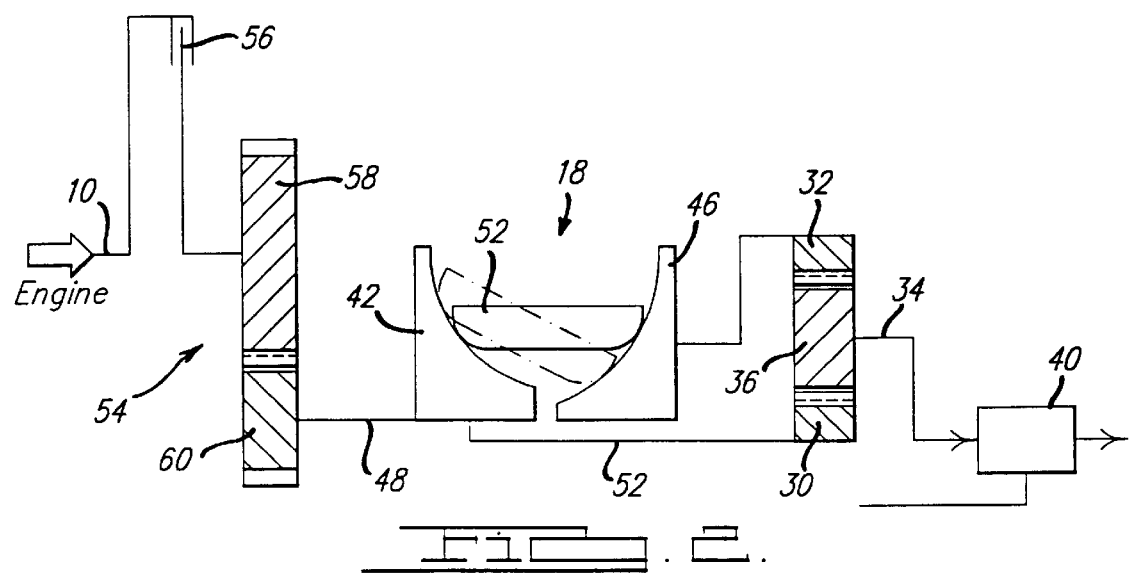
FIG. 2 is schematic diagram of another embodiment of a traction drive CVT.

Referring now to FIG. 2, a layshaft gearset 54, located in the torque delivery path between input disc 42 and a start-up clutch 56. Gearset 54 includes a pinion 58 and gear 60 in mutual meshing engagement. Preferably gear 60 has 40 teeth and pinion 58 has 80 teeth. Therefore, the gear ratio of gearset 54 is the same as that of gearset 12 and the speed of gear 60, disc 42 and sun gear 30 and speed ratio of variator 18 is 2.00 times that of shaft 10.

The angular disposition of rollers 52 disc 42 and sun gear 30 and speed ratio of variator 18 for low, overdrive, reverse and geared neutral operation are the same as for the transmission of FIG. 1. Accordingly the speed of disc 46 and ring gear 32 is 1.50, 4.222, 0.800, and 1.111 times engine speed, respectively. Therefore, the speed of output shaft 38 is 0.250, 2.00, −0.20 and zero, respectively.

Hydraulic pressure supplied to control operation of clutch 56 and brake 14 is modulated while accelerating a motor vehicle from rest in order to avoid harsh application of engine torque to the transmission output. Thereafter clutch 56 and brake 14 are fully engaged to produce forward and reverse drive. Clutch 56 and brake 14 are fully disengaged to produce a true neutral condition, i.e. the condition in which the engine is entirely disconnected from the transmission input.

Figure 3:
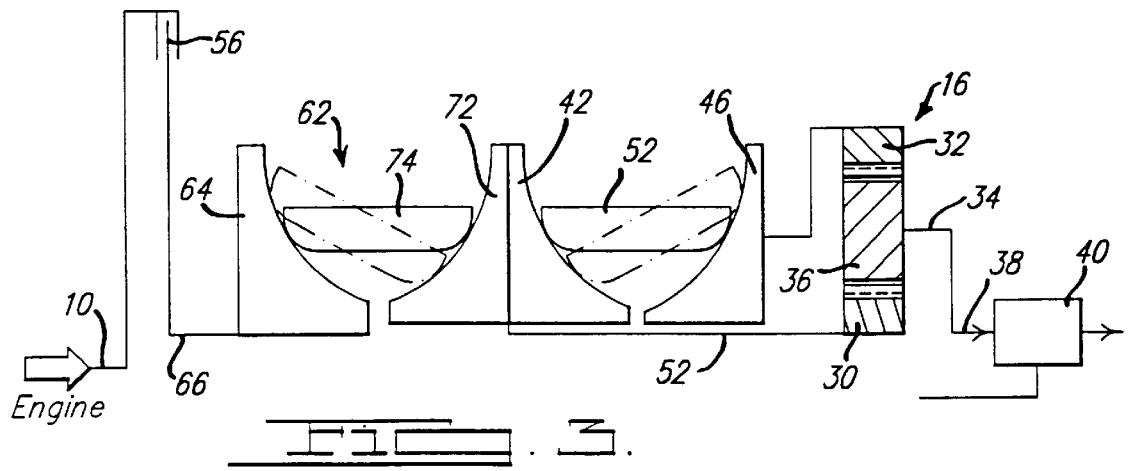
FIG. 3 is a schematic diagram of a continuously variable traction drive transmission embodying the present invention.

Referring now to FIG. 3, a second traction drive variator 62 includes an input disc 64 driveably connected by an input shaft 66 and through engagement of start-up clutch 56 to the engine shaft 10. Variator 62 also includes an output disc 72 driveably connected to disc 42 of variator 18, and a set of rollers 74 pivotably supported on trunnions about an axis normal to the axis of symmetry and driveably engaging discs 64, 72 at steplessly variable radial positions. Preferably rollers 74 are disposed to drive disc 72 at 2.00 times the speed of disc 64.

Similarly the angular disposition of rollers 52 disc 42 and sun gear 30 and speed ratio of variator 18 for low, overdrive, reverse and zero gear ratio operation are the same as for the transmission of FIG. 1, as described above. Accordingly the speed of disc 46 and ring gear 32 is 1.50, 4.222, 0.800, and 1.111 times engine speed, respectively. Therefore, the speed of output shaft 38 is 0.250, 2.00, −0.20 and zero, for each of the operating conditions, respectively.

Hydraulic pressure supplied to control operation of clutch 56 and brake 14 is modulated while accelerating a motor vehicle from rest in order to avoid harsh application of engine torque to the transmission output. Thereafter clutch 56 and brake 14 are fully engaged to produce forward and reverse drive. Clutch 56 and brake 14 are fully disengaged to produce a true neutral condition, i.e. the condition in which the engine is entirely disconnected from the transmission input.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A continuously variable transmission for a motor vehicle having a power source, comprising:
    an input shaft;
    an output shaft;
    a first traction drive variator including a first disc driveably connected to the input shaft, a second disc, and a first roller driveably engaging the first and second discs at variable radial positions, for driving the second disc at a slower speed and opposite direction than the speed and direction of the input shaft;
    a second traction drive variator including a third disc driveably connected to the second disc, a fourth disc, and a second roller driveably engaging the third and fourth discs at variable radial positions, for steplessly changing the speed of the fourth disc with respect to the speed of the third disc;
    a clutch for alternately driveably connecting and releasing the input shaft and power source; and
    a planetary gear unit having a sun gear driveably connected to at least one of the second disc and third disc, a ring gear driveably connected to the fourth disc, a carrier driveably connected to the output shaft, and a set of planet pinions rotatably supporting on the carrier and driveably engaged with the sun gear and ring gear.

2. The transmission of claim 1 further comprising a transfer case driveably connected to the output shaft for transmitting power from the output shaft to a front driveshaft and rear driveshaft.

3. The transmission of claim 1 wherein:

the first disc has a first surface, the second disc has a second surface facing the first surface, the first roller driveably engaging concurrently the first surface and second surface at variable radial positions on said first and second surfaces and driving the second disc from the first disc at speeds that changes with the radial position of engagement of the first roller on said surfaces; and the third disc has a third surface, the fourth disc has a fourth surface facing the third surface, the second roller driveably engaging concurrently the third surface and fourth surface at variable radial positions on said third and fourth surfaces and driving the fourth disc from the third disc at speeds that changes with the radial position of engagement of the second roller on said surfaces.

4. The transmission of claim 3 wherein the first and second surfaces define a toroidal cavity substantially concentric about an axis of rotation, within which cavity the first roller is located, the roller being angularly displaceable with respect to said axis.

5. A continuously variable transmission for a motor vehicle having front and rear driving wheels, comprising:

an input shaft;

an output shaft;

a first traction drive variator including a first disc driveably connected to the input shaft, a second disc, and a first roller driveably engaging the first and second discs at variable radial positions, for driving the second disc at a slower speed and opposite direction than the speed and direction of the input shaft;

a second traction drive variator including a third disc driveably connected to the second disc, a fourth disc, and a second roller driveably engaging the third and fourth discs at variable radial positions, for steplessly changing the speed of the fourth disc with respect to the speed of the third disc;

a clutch for alternately driveably connecting and releasing the input shaft and power source; and a gear unit having a first component driveably connected to the fourth disc, a second component driveably connected to at least one of the second disc and third disc, and an output driveably connected to the output shaft, for driving the output at a speed determined by the speeds of the first component and second component including a sun gear driveably connected to at least one of the second disc and third disc;

a ring gear driveably connected to the fourth disc;

a carrier driveably connected to the output shaft; and a set of planet pinions rotatable supporting on the carrier and driveably engaged with the sun gear and ring gear.

6. The transmission of claim 5 wherein:

the first disc has a first surface, the second disc has a second surface facing the first surface, the first roller driveably engaging concurrently the first surface and second surface at variable radial positions on said first and second surfaces and driving the second disc from the first disc at speeds that changes with the radial position of engagement of the first roller on said surfaces; and the third disc has a third surface, the fourth disc has a fourth surface facing the third surface, the second roller driveably engaging concurrently the third surface and fourth surface at variable radial positions on said third and fourth surfaces and driving the fourth disc from the third disc at speeds that changes with the radial position of engagement of the second roller on said surfaces.

7. The transmission of claim 6 wherein the first and second surfaces define a toroidal cavity substantially concentric about an axis of rotation, within which cavity the first roller is located, the roller being angularly displaceable with respect to said axis.

* * * * *